(12) United States Patent
Menge et al.

(10) Patent No.: US 8,803,075 B2
(45) Date of Patent: Aug. 12, 2014

(54) RADIATION DETECTOR DEVICE

(75) Inventors: Peter R. Menge, Chagrin Falls, OH (US); Csaba M. Rozsa, Brecksville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 613 days.

(21) Appl. No.: 12/426,740

(22) Filed: Apr. 20, 2009

(65) Prior Publication Data

US 2009/0261263 A1 Oct. 22, 2009

Related U.S. Application Data

(60) Provisional application No. 61/046,280, filed on Apr. 18, 2008.

(51) Int. Cl.
*G01V 5/04* (2006.01)
*G01T 1/20* (2006.01)

(52) U.S. Cl.
USPC ....... 250/253; 250/256; 250/261; 250/370.11

(58) Field of Classification Search
USPC ............ 250/253, 254, 255, 261, 256, 370.11; 313/541, 542
See application file for complete search history.

(56) References Cited

U.S. PATENT DOCUMENTS

| | | | |
|---|---|---|---|
| 3,247,377 A * | 4/1966 | Hall, Jr. | ........................ 376/165 |
| 4,945,227 A | 7/1990 | Jones et al. | |
| 4,963,727 A | 10/1990 | Cova | |
| 5,194,727 A | 3/1993 | Johnson et al. | |
| 5,847,397 A | 12/1998 | Moustakas | |
| 6,541,752 B2 | 4/2003 | Zappa et al. | |
| 6,758,326 B1 | 7/2004 | Benjamin | |
| 6,768,326 B2 | 7/2004 | Brown et al. | |
| 7,011,814 B2 | 3/2006 | Suddarth et al. | |
| 7,525,249 B2 * | 4/2009 | Suyama et al. | ............... 313/542 |
| 7,714,292 B2 | 5/2010 | Agarwal et al. | |
| 2004/0245592 A1 | 12/2004 | Harmon et al. | |
| 2005/0098844 A1 * | 5/2005 | Sandvik et al. | ............... 257/438 |
| 2008/0156993 A1 | 7/2008 | Weinberg et al. | |
| 2010/0314531 A1 | 12/2010 | Menge | |

OTHER PUBLICATIONS

Burton, "First principles phase diagram calculations for the wurtzite-structure systems AlN-GaN, GaN-InN, and AlN-InN," Journal of Applied Physics, 100, 113528; published Dec. 13, 2006; Retrieved from the internet [Jun. 9, 2011] Retrieved from url <http://authors.library.caltech.edu/7343>.*

(Continued)

*Primary Examiner* — David Porta
*Assistant Examiner* — Yara B Green
(74) *Attorney, Agent, or Firm* — Abel Law Group, LLP; Robert N. Young

(57) ABSTRACT

A radiation detector device is disclosed that includes a scintillator including a scintillator crystal and a hybrid photodetector (HPD) coupled to the scintillator. The HPD includes an electron tube having an input window and a photocathode adapted to emit photoelectrons when light passing through the input window strikes the photocathode. Further, the hybrid photodetector includes an electron detector adapted to receive photoelectrons emitted by the photocathode. The electron detector comprises a semiconductor material characterized by a bandgap of at least 2.15 eV.

21 Claims, 3 Drawing Sheets

(56) References Cited

OTHER PUBLICATIONS

Casady et al., "Status of Silicon Carbide (SiC) as a Wide-Bandgap Semiconductor for High-Temperature Applications: A Review," Solid-State Electronics vol. 39, No. 10, pp. 1409-1422, published 1996. Retrieved from the internet [Jun. 9, 2011] Retrieved from url <http://linkinghub.elsevier.com/retrieve/pii/0038110196000457>.*

Liu, "Low temperature synthesis of hexagonal phase ZnS nanocrystals by thermolysis of an air-stable single source molecular precuror in air," Materials Letters 60 (pp. 551-554; published Oct. 6, 2005. Retrieved from the internet [Jun. 9, 2011] Retrieved from url <http://linkinghub.elsevier.com/retrieve/pii/S0167577X0500916X>.*

D'Ambrosio et al., "Hybrid photon detector," Nuclear Instruments and Methods in Physics Research A, vol. 201, pp. 463-498, published 2003. Retrieved from internet [Mar. 29, 2012]; Retreived from url <http://www.sciencedirect.com/science/article/pii/SO168900203004315>.*

Hamamatsu Photonics K.K., "Photomultiplier Tubes, Basics and Applications", Feb. 2006 Third Edition, 324 pages.

Angelo J. Alfano, "Hybrid Photomultiplier: Its Characterization and Application as a Wide-Dynamic-Range Photon Detector" Applied Spectroscopy, vol. 52, Issue 2, pp. 303-307, http://www.opticsinfobase.org/abstract.cfm?URI=as-52-2-303, Feb. 21, 2008.

C.M. Rozsa, R. Dayton, P.Raby, M. Kusner, R. Schreiner, "Characteristics of Scintillators for Well Logging to 225degreesC", BicronCorporation, Newbury, Ohio 44065, copyright 1989, Bicron Corporation, Prepared for the IEEE Nuclear Science Symposium, San Francisco, Oct. 1989, Poster No. 5E4, 12 pages.

Buckley, S. et al., "Scalable Geiger/APD/PIN Multi-channel Sensing Platform," Proc. of SPIE: Semiconductor Photodetectors III, vol. 6119, 2006, 10 pgs.

U.S. Appl. No. 12/786,209, filed May 24, 2010, Inventor: Peter R. Menge.

* cited by examiner

US 8,803,075 B2

RADIATION DETECTOR DEVICE

CROSS-REFERENCE TO RELATED APPLICATION(S)

The present application claims priority from U.S. Provisional Patent Application No. 61/046,280, filed Apr. 18, 2008, entitled "Radiation Detector Device," naming inventors Peter R. Menge and Csaba M. Rozsa, which application is incorporated by reference herein in its entirety.

FIELD OF THE DISCLOSURE

The present disclosure is directed to radiation detector devices, particularly ruggedized scintillator devices for industrial applications.

BACKGROUND

Radiation detector devices are used in a variety of industrial applications. For example, scintillation detectors are used for well logging in the oil and gas industry. Typically, scintillation detectors have scintillator crystals made of an activated sodium iodide or other material that is effective for detecting gamma rays. Generally, the scintillator crystals are enclosed in casings or sleeves that include a window to permit radiation-induced scintillation light to pass out of the crystal package. The light passes to a light-sensing device such as a photomultiplier tube, and the photomultiplier tube converts the light photons emitted from the crystal into electrical pulses. The electrical pulses are shaped and digitized by associated electronics and may be registered as counts that are transmitted to analyzing equipment.

Scintillation detectors are useful for well logging, because the measurement of radiation, such as gamma rays and neutrons, allows users to analyze rock strata that surround a bore hole. Scintillation detectors can be used in drilling apparatuses themselves, giving rise to the common practice of measurement while drilling (MWD) (or logging while drilling). Nonetheless, MWD applications often take place in severe environments characterized by large amounts of heat, vibration and shock, which impact detector durability and accuracy.

Accordingly, the industry continues to need improvements in radiation detector devices, particularly durable ruggedized scintillation detectors that can withstand the harsh environments of industrial applications.

SUMMARY

A radiation detector device is disclosed and includes a scintillator including a scintillator crystal. The radiation detector device also includes a hybrid photodetector (HPD) coupled to the scintillator. The HPD includes an electron tube having an input window and a photocathode adapted to emit photoelectrons when light from the scintillator crystal passes through the input window and strikes the photocathode. Further, the hybrid photodetector includes an electron detector adapted to receive photoelectrons emitted by the photocathode. The electron detector comprises a semiconductor material characterized by a bandgap of at least 2.15 eV.

In another embodiment, a hybrid photodetector is disclosed that includes an electron tube having an input window. The hybrid photodetector also includes a photocathode adapted to emit photoelectrons when light passing through the input window strikes the photocathode. Further, the hybrid photodetector includes an electron detector adapted to receive photoelectrons emitted by the photocathode. The electron detector comprises a semiconductor material characterized by a bandgap of at least 2.15 eV.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present disclosure will be described with particular reference to exemplary embodiments. However, it should be understood that this class of embodiments provides only a few examples of the many advantageous uses of the innovative teachings herein. In general, statements made in the present disclosure do not necessarily limit any of the various claimed articles, systems or methods. Moreover, some statements may apply to some inventive features but not to others.

Figure 1:
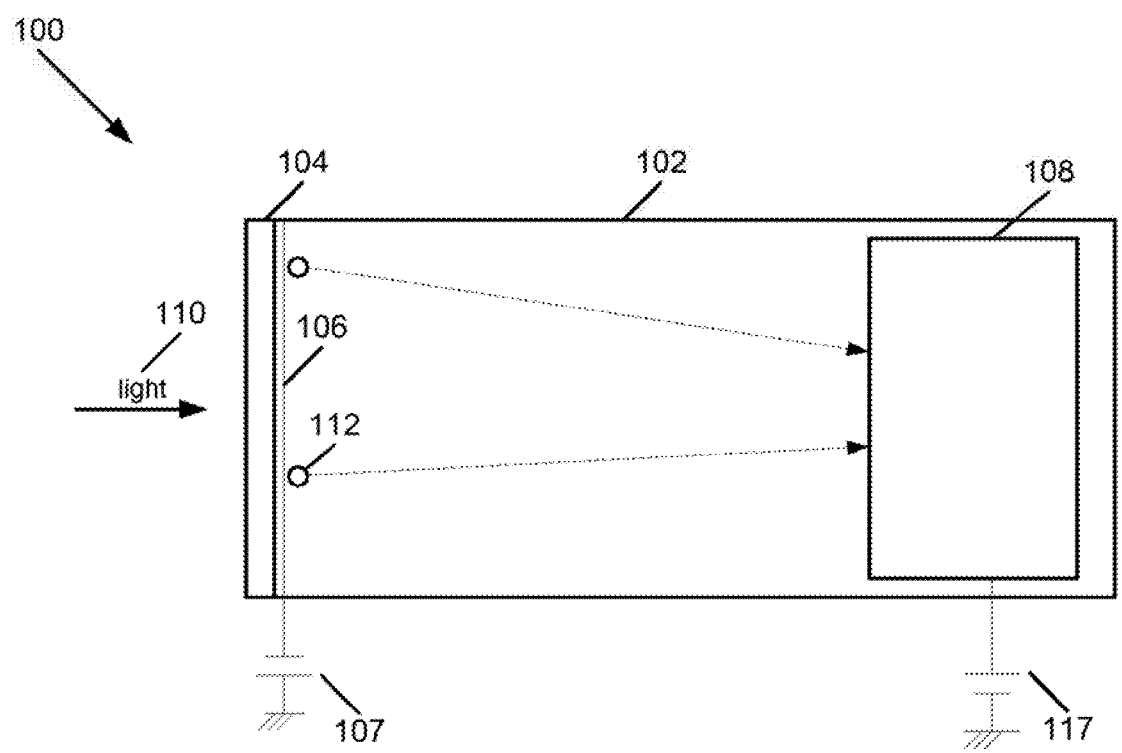
FIG. 1 is an illustration of a particular embodiment of a hybrid photodetector.

FIG. 1 shows a particular embodiment of a hybrid photodetector (HPD) 100. The HPD 100 includes an evacuated electron tube 102 having an input window 104. The HPD 100 also includes a photocathode 106 coupled to the input window 104. In an illustrative embodiment, the input window 104 comprises an optically transparent glass plate, such as a faceplate of the electron tube 102, and the photocathode 106 comprises a semiconductor material deposited as a film on the glass plate. In one example, the photocathode 106 may include a bialkali semiconductor material, such as sodium-potassium-antimony (Na—K—Sb). In another example, the photocathode 106 can include a multialkali semiconductor material, such as sodium-potassium-antimony-cesium (Na—K—Sb—Cs). In a further example, the photocathode 106 can include a III-V semiconductor material, such as gallium (II) arsenide (GaAs), or aluminum arsenide (AlAs).

Electrons in a valence band of the photocathode 106 absorb photon energy when light 110 passes through the input window 104 and strikes the photocathode 106. The electrons become excited until they are emitted as photoelectrons 112 from a surface of the photocathode 106 that is opposite the input window 104. In a particular embodiment, the surface of the photocathode 106 can include a layer of electropositive material (e.g., $Cs_2O$) that is adapted to facilitate emission of the photoelectrons 112 from the surface of the photocathode 106.

The HPD 100 includes an electron detector 108 disposed within the electron tube 102. Preferably, the electron detector 108 comprises a wide bandgap semiconductor material characterized by a bandgap of greater than or equal to approximately 2.15 eV, such as from approximately 2.15 eV to approximately 8 eV. Examples of wide bandgap semiconductor materials include silicon carbide (e.g., 4H α-SiC and 6H α-SiC), cubic zinc sulfide, hexagonal zinc sulfide, diamond, gallium (III) nitride, wurtzite-phase aluminum nitride (w-AlN), zinc selenide (ZnSe), and thallium bromide (TlBr).

Other examples include aluminum arsenide (AlAs), mercury sulfide (HgS), gallium (III) phosphide (GaP), aluminum phosphide (AlP), zinc telluride (ZnTe), cadmium sulfide (CdS), manganese selenide (MnSe), manganese telluride (MnTe), magnesium telluride (MgTe), manganese sulfide (MnS), magnesium selenide (MgSe), magnesium sulfide (MgS), lead iodide ($PbI_2$), thallium bromine iodide (TlBrI), indium aluminum phosphide (InAlP), and thallium lead iodide ($TlPbI_3$).

In an illustrative embodiment, a first voltage 107, such as a supply voltage or other voltage, can be applied to the photocathode 106. Photoelectrons 112 emitted from the surface of the photocathode 106 are accelerated, by the first voltage, to strike the surface of the electron detector 108. In addition, a second voltage, such as a reverse bias voltage or other voltage, can be applied to the electron detector 108. Energy from photoelectrons 112 entering the electron detector 108 produces carriers that are swept out of the electron detector 108 by the reverse bias voltage, creating an electrical current.

Figure 2:
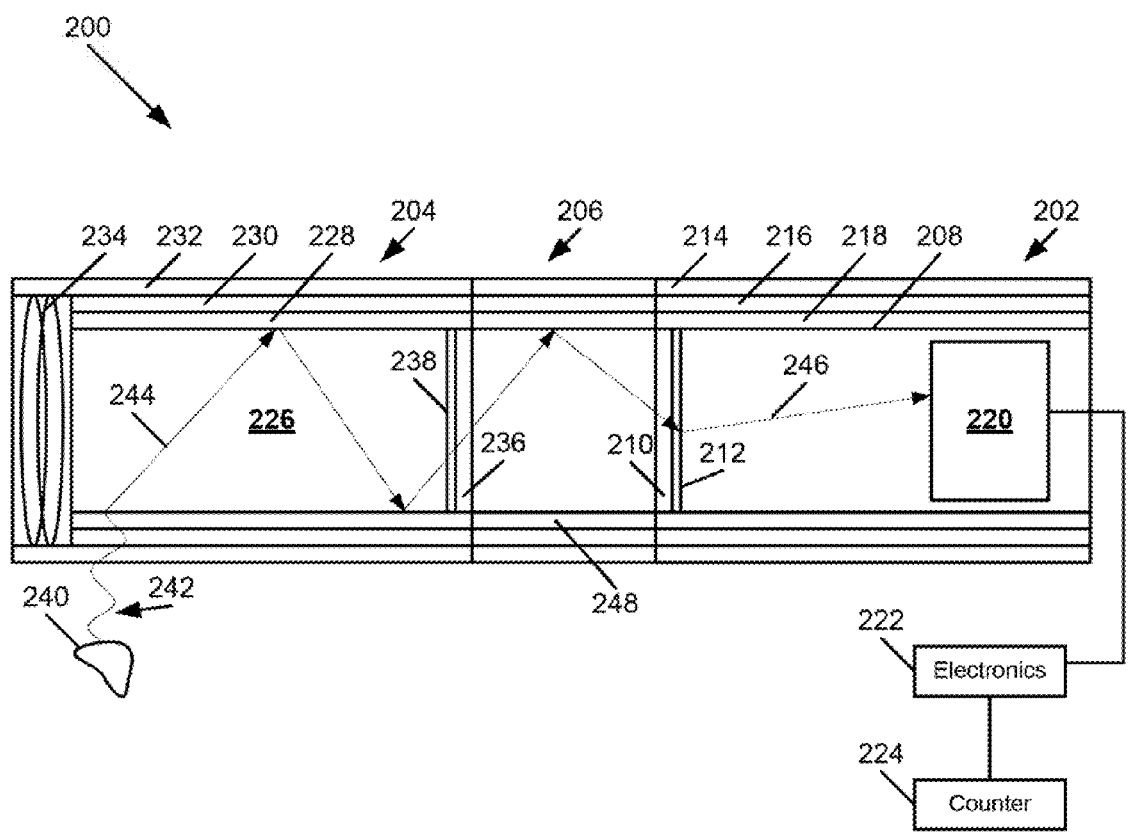
FIG. 2 is an illustration of a particular embodiment of a radiation detector device.

FIG. 2 shows a particular embodiment of a radiation detector device 200. The radiation detector device 200 includes a hybrid photodetector (HPD) 202 coupled to a scintillator 204. As shown, at least one light pipe 206 can be disposed between the HPD 202 and the scintillator 204. The radiation detector device 200 also includes at least one electronic device 222 that is adapted to communicate with a photon counter 224.

The HPD 202 includes an evacuated electron tube 208 having an input window 210 that comprises an optically transparent glass plate. In an illustrative embodiment, the electron tube can be evacuated to a vacuum level of less than or equal to $10^{-4}$ Torr. The HPD 202 also includes a photocathode 212. In one embodiment, the photocathode 212 comprises a semiconductor material deposited on a surface of the input window 210 that is opposite the light pipe 206. For example, the photocathode 212 can include a bialkali semiconductor material, a multialkali semiconductor material, a III-V semiconductor material, or another suitable semiconductor material.

The HPD 202 also includes an electron detector 220 that is adapted to convert photoelectrons into current. Preferably, the electron detector 220 comprises a semiconductor material characterized by a bandgap of at least 2.15 eV. For example, the electron detector 220 can comprise silicon carbide (e.g., 4H α-SiC and 6H α-SiC), cubic zinc sulfide, hexagonal zinc sulfide, diamond, gallium (III) nitride, wurtzite-phase aluminum nitride (w-AlN), or another semiconductor material having a bandgap of from approximately 2.15 eV to approximately 8 eV.

In an illustrative embodiment, the HPD 202 can be substantially surrounded at least along its length (i.e., such that the input window 210 and the end of the electron tube 208 opposite the input window 210 can be uncovered) by a housing 214. The housing 214 can comprise a material capable of protecting the electron tube 208, such as a metal, metal alloy, other material, or any combination thereof. In a particular embodiment, a layer of silicon rubber or other shock-absorbing material 216 can be disposed between the electron tube 208 and the housing 214. Further, a reflective material 218 adapted to reflect photoelectrons emitted by the photocathode 212 can be disposed between the shock absorbing material 216 and the electron tube 208.

The scintillator 204 includes a scintillator crystal 226 substantially surrounded at least along its length by a reflector 228. In one embodiment, the reflector 228 can include polytetrafluoroethylene (PTFE) or another material adapted to reflect light emitted by the scintillator crystal 226. The reflector 228 is substantially surrounded by a shock absorbing member 230. The scintillator crystal 226, reflector 228, and the shock absorbing member 230 are housed within a casing 232. The casing 232 can include a spring 234 or other stabilization mechanism interfaced to a first end of the scintillator crystal 226.

In addition, the casing 232 includes an output window 236 interfaced to a second end of the scintillator crystal 226. The output window 236 can include glass or another transparent or translucent material suitable to allow photons emitted by the scintillator crystal 226 and reflected by the reflector 228 to pass to the HPD 202 via the light pipe 206. In one embodiment, an optical interface 238 is disposed between the scintillator crystal 226 and the output window 236. The optical interface is polarized to optically couple the scintillator crystal 226 to the output window 236, by aligning the reflective indices of the scintillator crystal 207 and the output window 215. In one embodiment, the optical interface 238 can comprise clear silicon rubber.

As illustrated, the light pipe 206 is disposed between the HPD 202 and the scintillator 204 and facilitates optical coupling between the HPD 202 and the scintillator 204. The light pipe 206 can include a quartz light pipe, plastic light pipe, another light pipe, or any combination thereof. In some embodiments, multiple light pipes can be disposed between the HPD 202 and the scintillator 204. The light pipe 206 includes a reflector 248 that is adapted to cause light passing through the output window 236 to pass through the input window 210. The light pipe 206 can also include a casing, a shock absorbing layer, or a combination thereof.

In an illustrative embodiment, the radiation detector device 200 can measure types and densities of rock strata by analyzing radiation emitted by the scintillator 204. For example, a radiation source 240 can emit gamma rays 242 that cause the scintillator crystal 226 to emit light 244, such as visible or ultraviolet light. The reflector 228 can cause the light 244 to pass through the output window 236 to the light pipe 206, where the light 244 is directed by the reflector 248 to the input window 210 of the HPD 202. Electrons in a valence band of the photocathode 212 absorb photon energy when the light 244 passes through the input window 210 and strikes the photocathode 212. The electrons become excited until they are emitted as photoelectrons 246 from a surface of the photocathode 212 that is opposite the input window 210.

The photoelectrons 246 emitted from the surface of the photocathode 212 are accelerated by an electric field to strike the surface of the electron detector 220. In a particular embodiment, a first voltage is applied to the photocathode 212. Photoelectrons 246 emitted by the photocathode 212 are accelerated, by the first voltage, to strike the electron detector 220. Further, a second voltage can be applied to the electron detector 220. Carriers produced by the energy of photoelectrons 246 striking the electron detector 220 are swept out of the electron detector 220 by the second voltage to produce a current.

The electronic device(s) 222 are adapted to receive current output from the electron detector 220. The electronic device(s) 222 can include an amplifier, a pre-amplifier, a discriminator, an analog-to-digital signal converter, other electronic devices, or any combination thereof. The electronic device(s) 222 are adapted to convert the current output from the electron detector 220 to electrical pulses and to send at least some of the electrical pulses to the photon counter 224. The photon counter 224 is adapted to count photons emitted by the scintillator crystal based on a pulse height of each electrical pulse received by the photon counter.

In a particular embodiment, the electronics 222 are adapted to manipulate and digitize the electrical pulses before sending them to the photon counter 224. In one example, the electronics 222 can be adapted to analyze pulse height and to eliminate particular pulses based on their amplitudes. For instance, multiple photoelectrons emitted from the photocathode 212 create a higher pulse height than dark current pulses or noise pulses related to concrete, steel, atmospheric conditions, materials used in the HPD 202 itself, other sources, or any combination thereof. Electrical pulses having a pulse height lower than a discrimination level, such as 10 keV or another minimum pulse height, can be eliminated.

Figure 3:
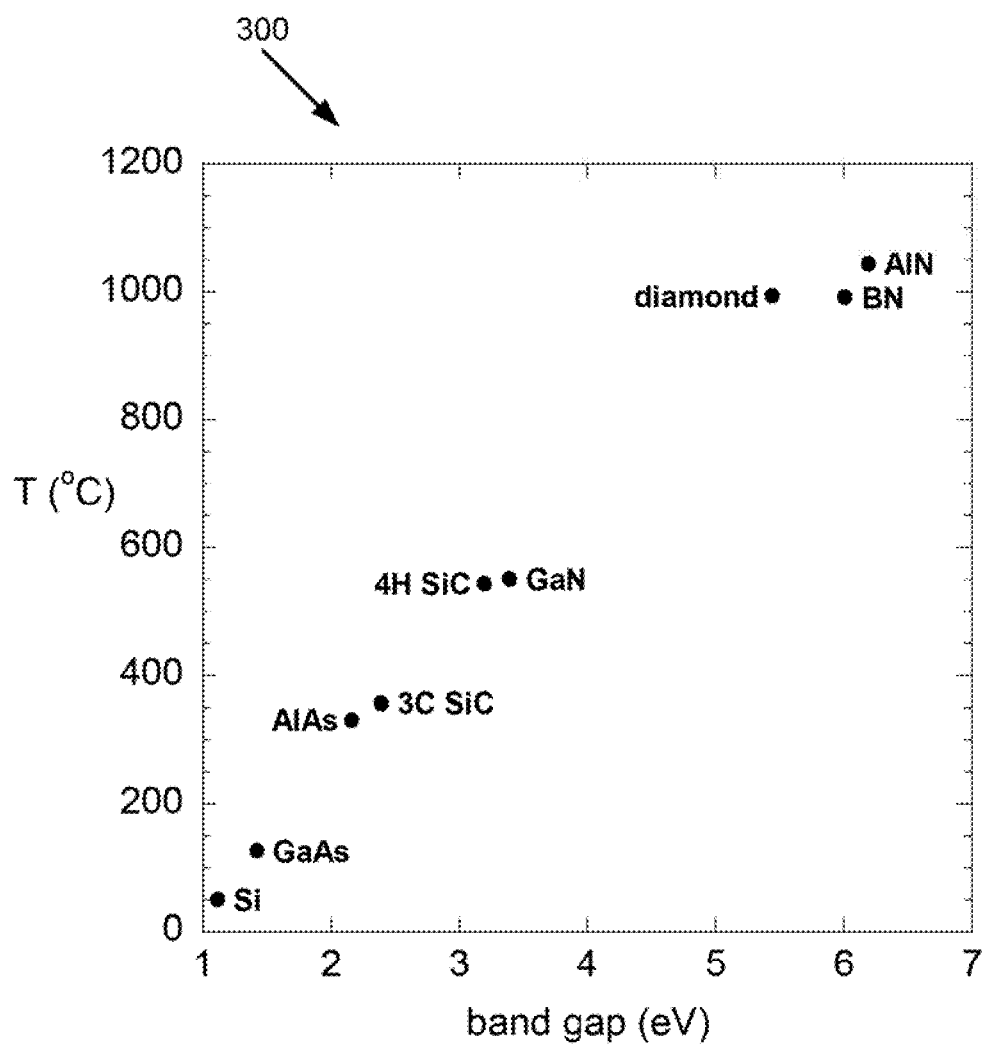
FIG. 3 is a plot illustrating operating temperatures of a hybrid photodetector (HPD) as bandgap increases in a semiconductor used as an electron detector in the HPD.

FIG. 3 is a plot 300 showing theoretical maximum operating temperatures of a hybrid photodetector (HPD) as bandgap increases in a semiconductor used as an electron detector in the HPD. Specifically, the plot 300 shows theoretical maximum operating temperatures at which signal-to-noise ratios for example semiconductors are substantially equivalent to each other and to silicon at 50° C. TABLE 1 includes data illustrated by the plot 300.

TABLE 1

| Material | Si | GaAs | AlAs | 3C SiC | 4H SiC | GaN | Diamond | BN | AlN |
| --- | --- | --- | --- | --- | --- | --- | --- | --- | --- |
| Bandgap (eV) | 1.12 | 1.43 | 2.17 | 2.4 | 3.2 | 3.4 | 5.45 | 6.02 | 6.2 |
| T (° C.) | 50 | 126 | 330 | 356 | 543 | 550 | 992 | 990 | 1043 |

In conjunction with the configuration and structure disclosed herein, a hybrid photodetector is provided having an electron detector that comprises a semiconductor material characterized by a bandgap of at least 2.15 eV. In addition, a radiation detector device is provided that includes a hybrid photodetector having an electron detector that comprises a semiconductor material characterized by a bandgap of at least 2.15 eV. The use of a wide bandgap semiconductor as an electron detector enables the hybrid photodetector to operate effectively at higher temperatures (e.g., at or above 200° C.) than other devices using semiconductors characterized by lower bandgaps, such as hybrid photomultiplier tubes having PIN diodes.

The use of a hybrid photodetector (HPD) provides numerous advantages over conventional PMTs and similar devices. For example, the lack of a dynode chain makes the HPD more compact than a conventional PMT (approximately 2.5-3.8 cm long versus approximately 10 cm long). This is valuable for keeping the well-logging detector string short and easy to handle. Additionally, the lack of a dynode chain causes the HPD to exhibit less gain variation than a conventional PMT and to thus produce better energy resolution. Moreover, supporting dynodes in a rugged way is often difficult, and relative movement of dynodes can cause noise and additional gain variance. The elimination of dynodes in the HPD allows for better ruggedization.

In addition, an HPD with a wide bandgap semiconductor is superior to a wide bandgap photodiode like that disclosed in U.S. Pat. No. 6,768,326. The HPD uses the wide bandgap semiconductor as an electron detector, rather than a photon detector. Due to the higher intrinsic gain of the HPD, it would have a greater signal-to-noise ratio than a corresponding photodiode. Further, the surface of the semiconductor would not need to be made rough or to be optically treated in the HPD, as with the photodiode. Moreover, the photodiode typically requires a scintillator crystal having a composition that is matched to the spectral sensitivity of the photodiode. Because the HPD does not require a scintillator crystal that emits UV or near-UV light, traditionally-used scintillator crystals for well-logging could be used with a HPD. Wide bandgap photodiodes are most sensitive at UV and near-UV wavelengths.

What is claimed is:

1. A radiation detector device, comprising:
    a scintillator including a scintillator crystal; and
    a hybrid photodetector (HPD) coupled to the scintillator, the HPD including:
        an electron tube having an input window;
        a photocathode adapted to emit photoelectrons when light from the scintillator crystal passes through the input window and strikes the photocathode; and
        an electron detector adapted to receive photoelectrons emitted by the photocathode, wherein the electron detector comprises a semiconductor material characterized by a bandgap of at least 2.15 eV,
    wherein the radiation detector device is a well-logging detector device.

2. The radiation detector device of claim 1, wherein the electron detector comprises a semiconductor material characterized by a bandgap of from approximately 2.15 eV to approximately 8 eV.

3. The radiation detector device of claim 1, wherein the electron detector comprises silicon carbide, zinc sulfide, gallium (III) nitride, diamond, aluminum nitride, zinc selenide, or thallium bromide.

4. The radiation detector device of claim 1, wherein the photocathode comprises a bialkali semiconductor material, a multialkali semiconductor material, or a III-V semiconductor material.

5. The radiation detector device of claim 1, further comprising at least one electronic device adapted to receive current output from the electron detector, to convert the current to electrical pulses, and to send at least some of the electrical pulses to a photon counter.

6. The radiation detector device of claim 5, wherein the photon counter is adapted to count photons emitted by the scintillator crystal based on a pulse height of each electrical pulse received by the photon counter.

7. The radiation detector device of claim 5, wherein the at least one electronic device is adapted to eliminate electrical pulses having an amplitude lower than a minimum amplitude before sending the at least some of the electrical pulses to the photon counter.

8. The radiation detector device of claim 7, wherein the electrical pulses having an amplitude lower than a minimum amplitude correspond to dark current pulses, noise pulses, or a combination thereof.

9. The radiation detector device of claim 1, wherein the electron tube comprises a vacuum level of less that or equal to $10^{-4}$ Torr.

10. A hybrid photodetector, comprising:
    an electron tube having an input window;
    a photocathode adapted to emit photoelectrons when light passing through the input window strikes the photocathode; and
    an electron detector adapted to receive photoelectrons emitted by the photocathode, wherein the electron detector comprises a semiconductor material characterized by a bandgap of at least 2.15 eV, wherein the hybrid photodetector does not include a dynode.

11. The hybrid photodetector of claim 10, wherein the electron detector comprises a semiconductor material characterized by a bandgap of from approximately 2.15 eV to approximately 8 eV.

12. The hybrid photodetector of claim 10, wherein the electron detector comprises silicon carbide, zinc sulfide, gallium (III) nitride, diamond, aluminum nitride, zinc selenide, or thallium bromide.

13. The hybrid photodetector of claim 12, wherein the electron detector comprises silicon carbide.

14. The hybrid photodetector of claim 12, wherein the electron detector comprises cubic zinc sulfide or hexagonal zinc sulfide.

15. The hybrid photodetector of claim 12, wherein the electron detector comprises wurtzite-phase aluminum nitride.

16. The hybrid photodetector of claim 10, wherein the photocathode comprises a bialkali semiconductor material, a multialkali semiconductor material, or a III-IV semiconductor material.

17. The hybrid photodetector of claim 16, wherein the photocathode comprises sodium-potassium-antimony (Na—K—Sb).

18. The hybrid photodetector of claim 16, wherein the photocathode comprises sodium-potassium-antimony-cesium (Na—K—Sb—Cs).

19. The hybrid photodetector of claim 16, wherein the photocathode comprises gallium (II) arsenide (GaAs) or aluminum arsenide (AlAs).

20. The hybrid photodetector of claim 16, wherein the photocathode comprises cesium oxide.

21. The hybrid photodetector of claim 10, wherein a first voltage is applied to the photocathode and wherein photoelectrons emitted by the photocathode are accelerated by the first voltage to strike the electron detector.

* * * * *